(12) United States Patent
Kortzin

(10) Patent No.: US 11,914,570 B2
(45) Date of Patent: Feb. 27, 2024

(54) DYNAMIC MULTIPLE DATABASE MANAGEMENT FOR LEARNING AND PLAYING BACK ELECTROMAGNETIC SIGNALS

(71) Applicant: Flirc Inc., San Jose, CA (US)

(72) Inventor: Jason Kortzin, Santa Clara, CA (US)

(73) Assignee: Flirc Inc., San Jose, CA (US)

( * ) Notice: Subject to any disclaimer, the term of this patent is extended or adjusted under 35 U.S.C. 154(b) by 0 days.

(21) Appl. No.: 18/083,398

(22) Filed: Dec. 16, 2022

(65) Prior Publication Data

US 2023/0121898 A1  Apr. 20, 2023

Related U.S. Application Data

(63) Continuation of application No. 15/998,875, filed on Aug. 15, 2018, now abandoned.

(51) Int. Cl.
  *G06F 16/23* (2019.01)
  *G06F 16/248* (2019.01)
  *G06F 16/25* (2019.01)
  *G06F 16/22* (2019.01)

(52) U.S. Cl.
  CPC ...... *G06F 16/2308* (2019.01); *G06F 16/2255* (2019.01); *G06F 16/248* (2019.01); *G06F 16/258* (2019.01)

(58) Field of Classification Search
  CPC .. G06F 16/2308; G06F 16/248; G06F 16/258; G06F 16/2255; G06F 16/00; G06F 16/2457; G06F 16/9535; G06F 16/24578; G06F 16/24544; G06F 16/24539; G06F 16/9536; G06F 16/2468; G06F 16/9024; G06F 16/24573; G06F 16/2246; G06F 16/223; G06F 16/216; G06F 16/23; G06F 16/2237
  USPC ........................................................ 707/704
  See application file for complete search history.

(56) References Cited

U.S. PATENT DOCUMENTS

| | | | |
|---|---|---|---|
| 10,686,856 B1* | 6/2020 | Straitiff | H04N 21/4227 |
| 2004/0003003 A1* | 1/2004 | McCartney | G06F 16/2372 |
| 2007/0054668 A1* | 3/2007 | Scheinert | H04L 63/101 |
| | | | 455/433 |
| 2007/0130174 A1* | 6/2007 | Ramesh | G06Q 40/04 |
| 2009/0193060 A1* | 7/2009 | Stefani | G06F 16/2453 |
| 2009/0254514 A1* | 10/2009 | Adair | G06F 16/24534 |
| | | | 707/999.002 |
| 2013/0004178 A1* | 1/2013 | Kotzin | G08C 23/04 |
| | | | 398/106 |
| 2016/0188622 A1* | 6/2016 | Sharangpani | G06F 16/2246 |
| | | | 707/693 |

(Continued)

*Primary Examiner* — Shahid A Alam
(74) *Attorney, Agent, or Firm* — North Weber & Baugh LLP; Michael North

(57) ABSTRACT

Dynamically enabling and disabling databases containing one or more representations of learned or known electromagnetic signals. The databases can be dynamically enabled or disabled in software, firmware, and/or in hardware. Enabling or disabling databases in software can be accomplished using a customized application external to the device. Enabling or disabling databases in firmware can be accomplished using a profile stored on the device, or external circuitry stored on the device. Enabling or disabling databases in hardware can be accomplished using specialized external hardware through infrared, or other type of electromagnetic interface.

14 Claims, 10 Drawing Sheets

(56) References Cited

U.S. PATENT DOCUMENTS

| | | | | |
|---|---|---|---|---|
| 2016/0191589 | A1* | 6/2016 | Abramov | H04L 65/70 |
| | | | | 709/219 |
| 2017/0193101 | A1* | 7/2017 | Sharma | G06F 16/951 |
| 2017/0262446 | A1* | 9/2017 | McLaughlin | G06F 16/9535 |
| 2017/0371872 | A1* | 12/2017 | McBride | G06F 16/2379 |
| 2018/0370360 | A1* | 12/2018 | Hannon | H04W 4/48 |

* cited by examiner

DYNAMIC MULTIPLE DATABASE MANAGEMENT FOR LEARNING AND PLAYING BACK ELECTROMAGNETIC SIGNALS

CROSS REFERENCE TO RELATED PATENT APPLICATIONS

This application is a continuation of U.S. patent application Ser. No. 15/998,875, entitled "DYNAMIC MULTIPLE DATABASE MANAGEMENT FOR LEARNING AND PLAYING BACK ELECTROMAGNETIC SIGNALS", naming inventor as Jason Kortzin filed on Aug. 15, 2018, which application is hereby incorporated herein by reference in its entirety.

BACKGROUND

Field

An embodiment of the invention relates to dynamically enabling and disabling databases storing representations of electromagnetic signals. Other embodiments are also described.

Presently, various devices and methods are known in the art relating to learning, processing, and storing representations of electromagnetic signals. The device can read in a signal, convert the signal to a hash code and store the hash code in memory. This stored signal code can then be triggered when detected by the USB device and send a designated signal to the computer. For example, the Flirc USB device is able to read in an infrared signal, store the signal and interact with software on a computer to play back the recorded signal as a preset computer function. The Flirc USB can store thousands of representations of IR signals emitted by different remote controls and associated with different devices.

Other devices that store representations of electromagnetic remote control signals include learning remote controls, other USB infrared (IR) receivers, and IR receivers integrated into computers or other devices. Each of these devices are able to learn and/or store representations of electromagnetic signals emitted by IR or radio frequency remote controls.

In devices that store multiple representations of electromagnetic signals, such as the Flirc USB, the stored representations are assembled together into a database. The database corresponds to a set of commands intended to work with a particular device and/or particular computer application. For example, one database may contain a set of representations of electromagnetic signals corresponding to commands used to control computer software running a specific media center software application. A single room contain multiple Flirc USB devices operating concurrently with multiple databases used for various combinations of devices and/or software applications.

In some instances, a user may wish to operate combinations of devices with multiple databases concurrently. In other instances, operating multiple databases concurrently may cause undesirable results such as sending multiple unintended signals to a single device or sending signals to multiple devices in the same room that are not intended to by operated by the user. As a result, a user may need to dynamically enable or disable databases depending on the desired application.

Currently, many learning IR remote controls allow for multiple databases to be stored locally on the remote control. When the databases are stored locally on the remote control, a user can switch between multiple databases by pressing a button on the remote control. However, when databases are stored on a separate device such as Flirc USB, computer, or other device, a solution for dynamic switching of databases is needed but unavailable.

SUMMARY OF INVENTION

An embodiment of the invention is directed to dynamically enabling and disabling multiple databases containing multiple recorded electromagnetic signals associated with computer commands and stored on a device. The databases may be enabled or disabled by the user dynamically in order to optimize user experience and prevent undesirable results such as sending multiple unintended commands to a single device or a single command to multiple devices when the user only intends to operate one device.

In one embodiment of the invention, databases are dynamically enabled or disabled using a software application. The software application allows the user to select which databases are enabled or disabled. Dynamically enabling and disabling databases using a software application allows the user to easily enable or disable databases and immediately see which databases are enabled or disabled. The software application can also read the device and provide the user with information about which databases are enabled and which are disabled.

In another embodiment of the invention, databases are dynamically enabled or disabled using the device's firmware. The device is able to detect which database(s) are appropriate depending on which type of hardware (e.g. computer, media center, streaming media device, etc.) the device detects when it is connected.

In another embodiment of the invention, databases are dynamically enabled or disabled using an externally controlled hardware command. For example, a button can be pressed on a remote control that enables or disables a particular database. The user can enable or disable databases depending on the application. The user can also enable or disable customized databases previously created by the user.

The above summary does not include an exhaustive list of all aspects of embodiments of the present invention. It is contemplated that embodiments of the invention include all systems and methods that can be practiced from all suitable combinations of the various aspects summarized above, as well as those disclosed in the Detailed Description below and particularly pointed out in the claims filed with the application. Such combinations have particular not specifically recited in the above summary.

BRIEF DESCRIPTION OF THE DRAWINGS

Reference will be made to embodiments of the invention, examples of which may be illustrated in the accompanying figures. These figures are intended to be illustrative, not limiting.

DETAILED DESCRIPTION OF THE INVENTION

Figure 1:
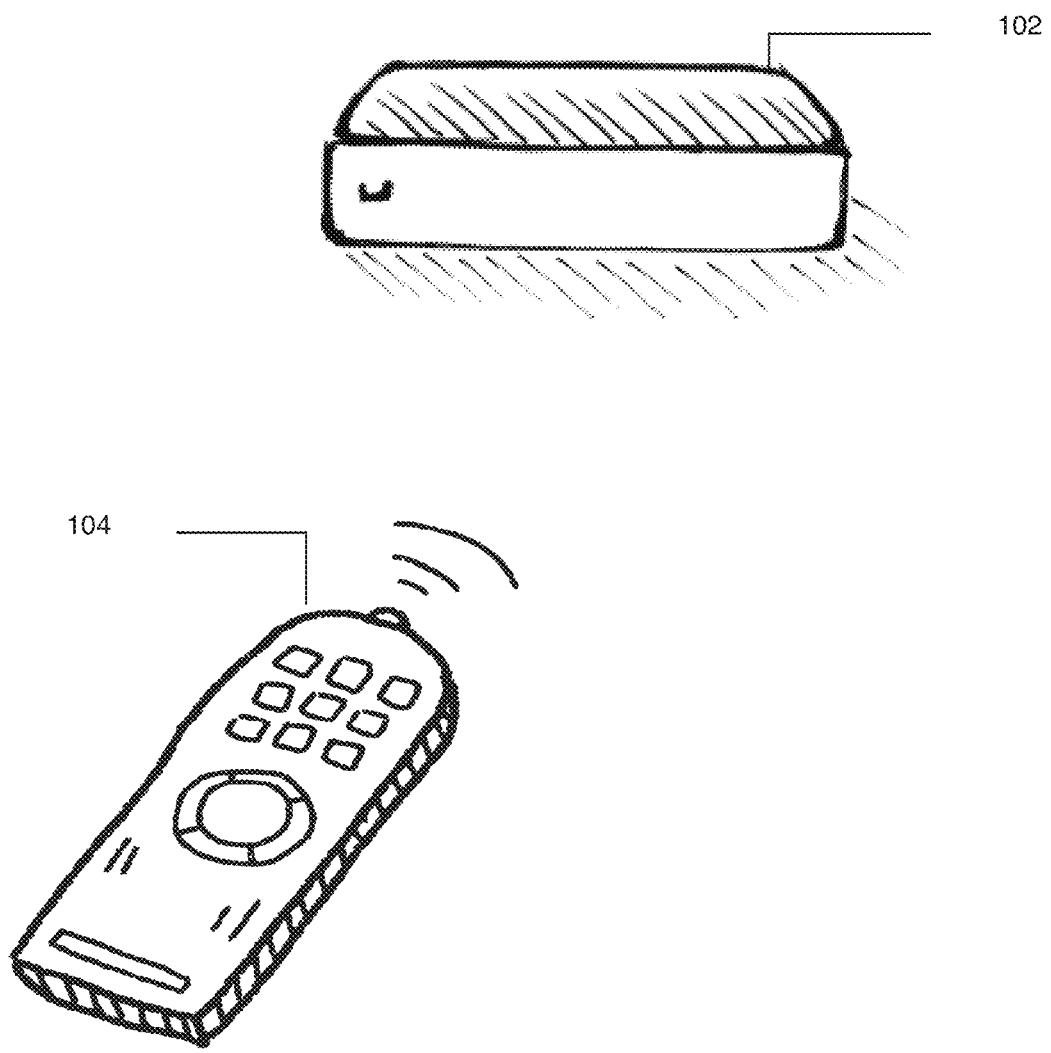
FIG. 1 depicts the prior art instantiation of a remote control sending a signal to a device containing a database with a hash table containing a packet corresponding to the signal being sent by the remote control.

FIG. 1 depicts an example of one application of a remote control 104 sending a signal to a device 102 containing a database with hashed codes corresponding to previously recorded signals. In this instance, the electromagnetic signal is an infrared (IR) signal. The IR signal is encoded to correspond to the particular button pressed on the remote control 104. The database on the device 102 contains a stored value, e.g. a hash value, corresponding to one or more encoded signals. If one of the stored hash values in the device 102 corresponds to the encoded signal sent from the remote control, the device will send the corresponding functional signal to perform a task. For example, the corresponding functional signal can be an equivalent output of a particular keystroke from a human interface device (HID) such as a keyboard.

The previously recorded IR signal stored in the database of the device 102 could have been programmed by the original equipment manufacturer (OEM), through a learning function built into the device 102, or through the method and using the device disclosed in, inter alfa, U.S. Pat. No. 9,257,040 ('040 Patent). Other methods of recording signals are known in the art. Once a database of values is created through any of the foregoing methods, the database is enabled by default and an electromagnetic signal corresponding to one stored in the database will result in the device 102 sending the corresponding functional command each time the electromagnetic signal is detected. While this approach is acceptable in many use cases, as will be further explained below, potential problems or unintended consequences may arise as a result of a database always being enabled on a device.

Figure 2:
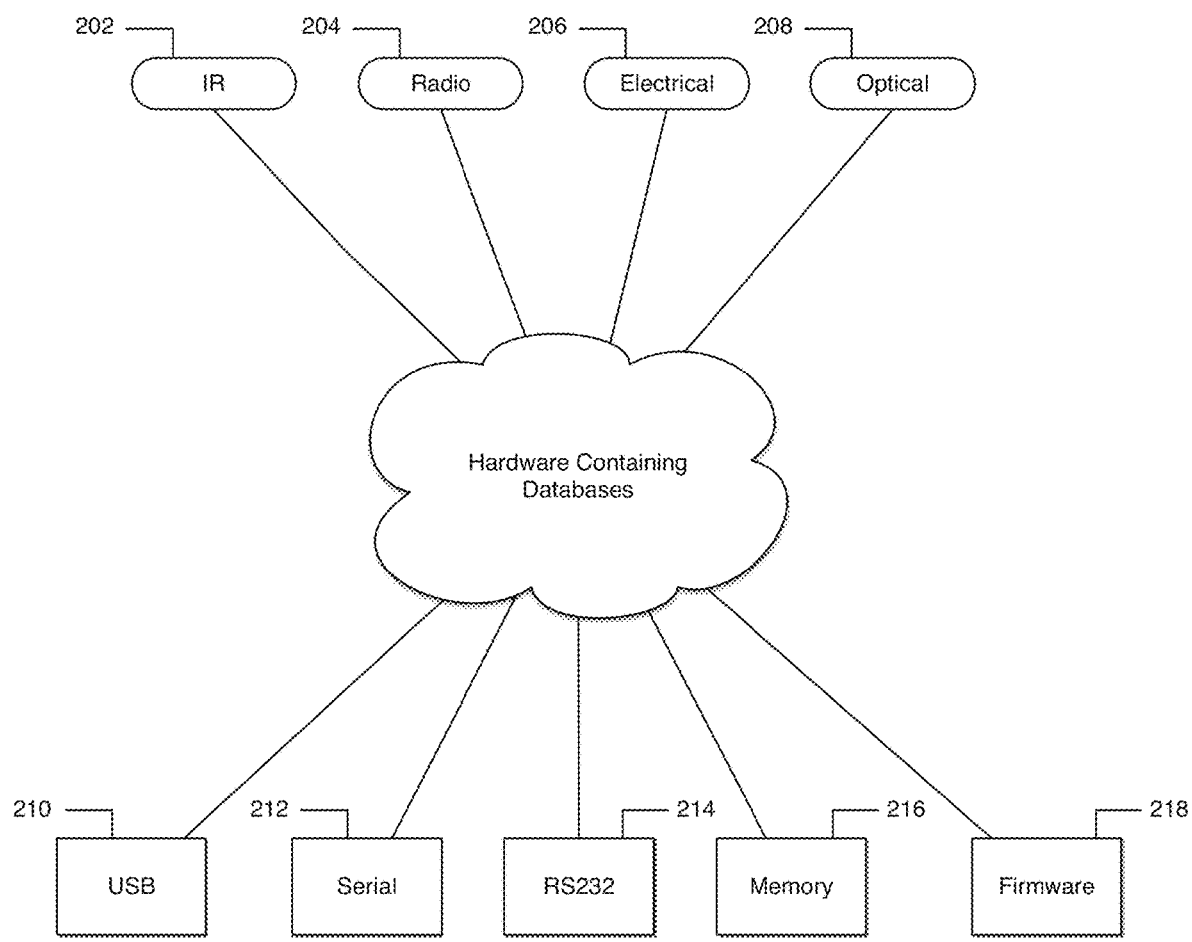
FIG. 2 depicts various types of electromagnetic signals external or internal as well as internal methodologies for selecting, enabling, or disabling a database(s).

FIG. 2 shows several alternative implementations of a system that is capable of enabling or disabling a database or databases. For example, an IR 202 electromagnetic signal can be used to initiate a set of steps in firmware or software that enable or disable a database. In addition, a database(s) can be enabled using other electromagnetic signals such as radio 204, electrical 206, or optical 208, or through different serial buses (USB 210, serial 212 or RS232 214), and self contained in a device directly from memory 216, firmware 218 or based on a hardware configuration.

Figure 3:
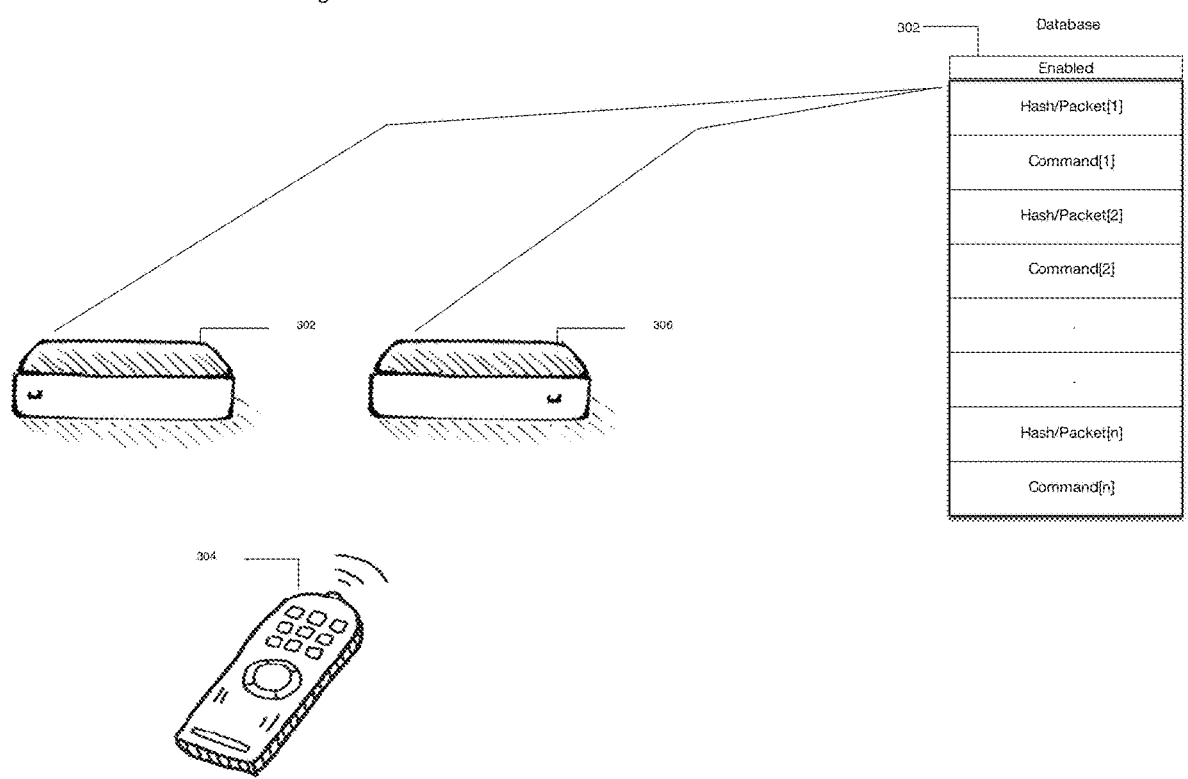
FIG. 3 depicts a single remote control sending one electromagnetic signal that reaches two different devices that both contain the same database.

FIG. 3 shows one scenario where sending a single electromagnetic signal can create an unintended and undesirable outcome. Similar to FIG. 1, there is a remote control that sends out an electromagnetic signal. In this instance, there are two devices 302 and 306 in the same room or with the ability to receive the single electromagnetic signal emitted by the remote control 304. Each device 302 and 306 contains at least one identical database 308 with identical sets of hash/packet corresponding to a command. Each device may also contain numerous identical databases. When both devices 302 and 306 receive the single electromagnetic signal sent by remote control 304, both send out the corresponding commands in their respective database 308. However, the signal is generally intended to only reach one of the devices rather than both. As a result, one device sends a command that was not intended to be sent by the user.

This situation is not limited to devices in the same room. Although an IR signal generally would only be received by devices that are not separated by a physical barrier such as a wall, a single radio signal could reach multiple devices even if they are in separate rooms or even separate buildings. Therefore, this problem may occur in many varying scenarios and requires a solution.

Figure 4:
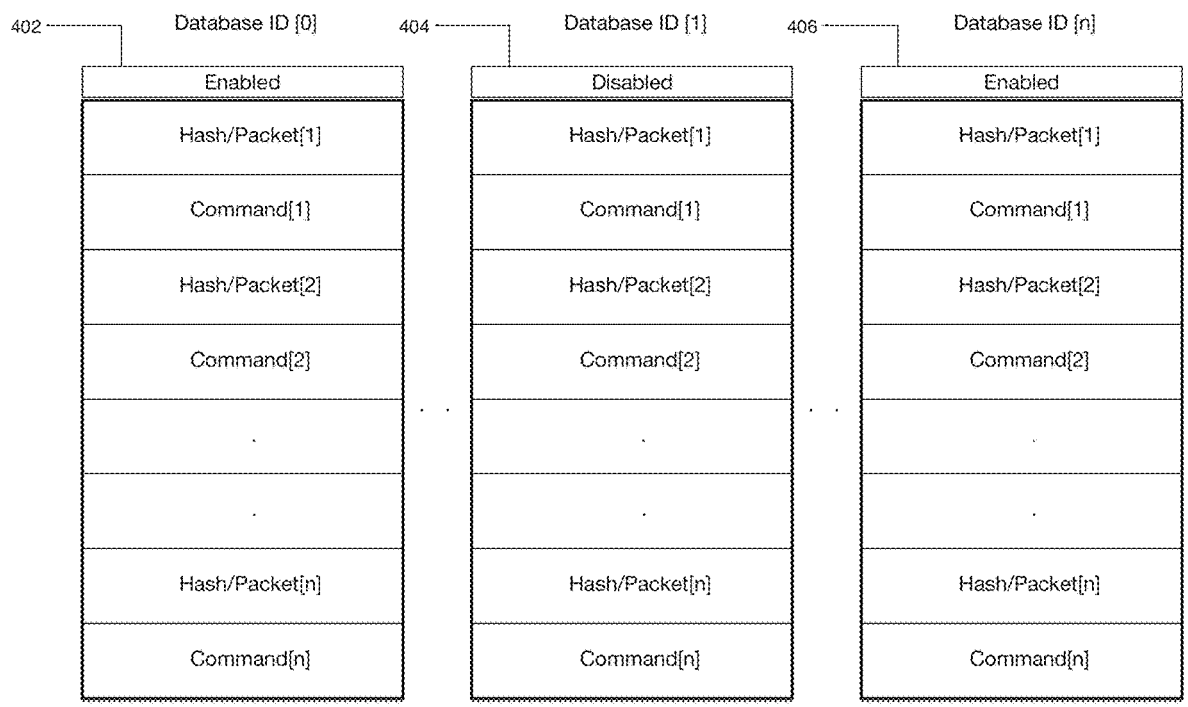
FIG. 4 depicts a set of multiple databases that are stored on or accessed by a device.

FIG. 4 shows that multiple databases 402, 404, and 406 may be stored on or accessed by a single device. In addition to each database creating an additional opportunity for the multiple identical instantiations on multiple devices described in FIG. 3, having multiple databases with potentially the same hash/packet corresponding to multiple different commands creates an additional scenario wherein a single electromagnetic signal can result in multiple unintended commands being sent by the device. As a result, a solution to dynamically manage which databases are enabled and disabled is needed. The software, firmware, and hardware embodiments of the current invention provide several solutions allowing databases on a device to be dynamically enabled or disabled.

Figure 5:
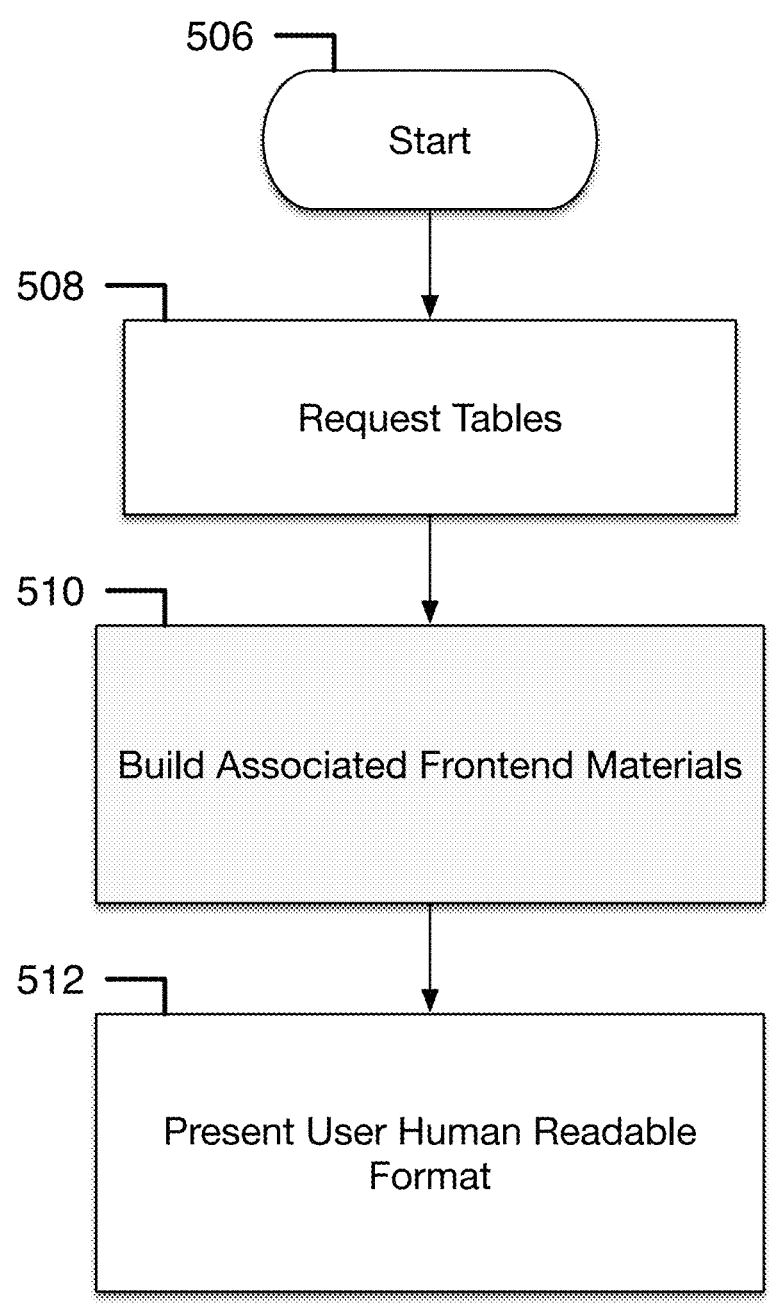
FIG. 5 depicts a diagram with steps that allow the collection of all databases on a single device and providing the resulting list to a user in a human readable format.

FIG. 5 contains the first set of steps used in the software embodiment of the invention that allow the collection of all databases on a single device and providing the resulting list to a user in a human readable format. First, the software starts 506 the process to collect a list of all databases stored on a particular device. The software then requests a list of all databases 508 that are stored on the device. Using techniques commonly known in the art, the software is configured to build the associated frontend materials 510 that will be presented to the user corresponding to all databases that were found on the device during the preceding step 508. Finally, the software presents the list of databases found on the device in a human readable format 512. As will be further discussed below, the final user presented human readable format allows the user to dynamically enable and disable the databases found and presented to the user through the steps set forth in FIG. 5.

Figure 6:
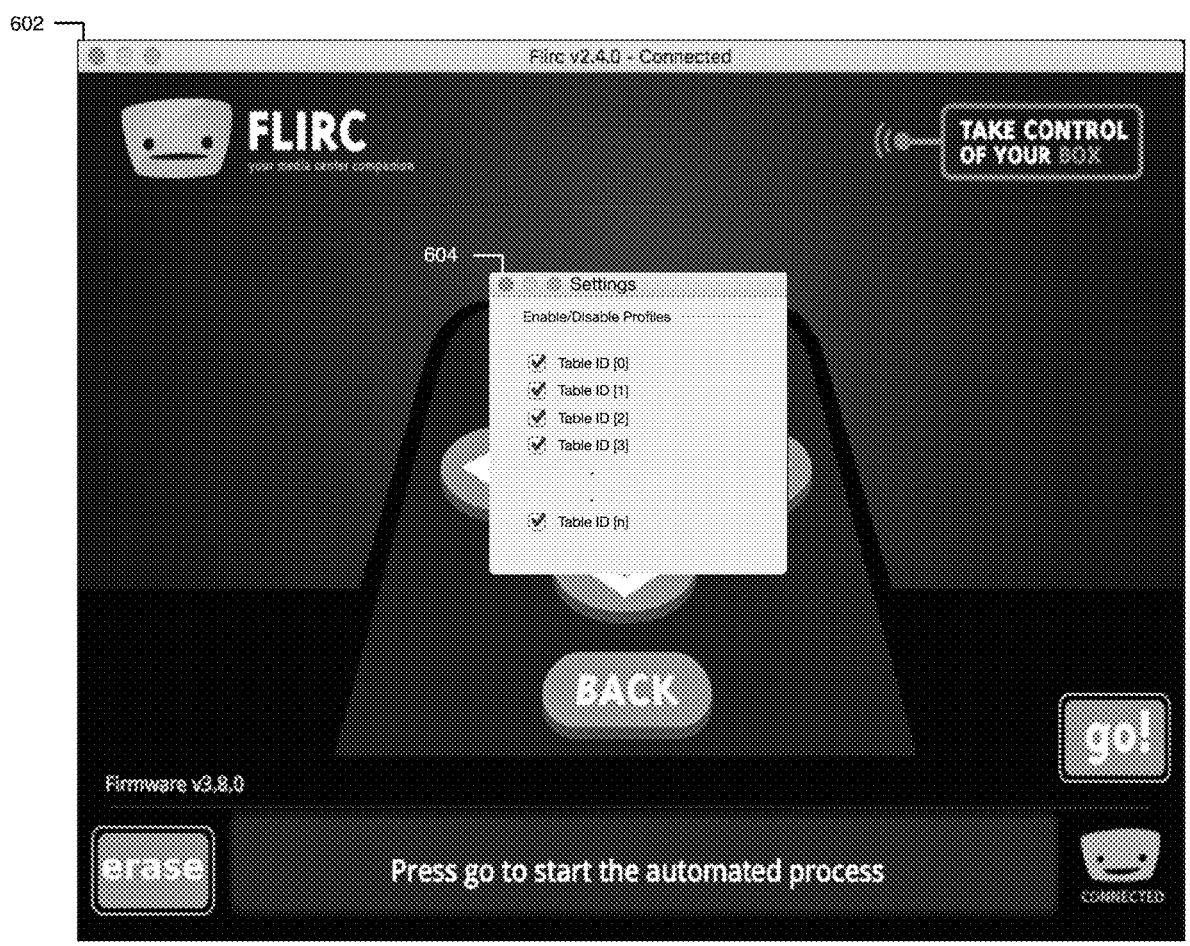
FIG. 6 depicts a software implementation of the list of databases in a human readable format that can be dynamically enabled or disabled using the software interface.

FIG. 6 shows one software implementation of the human readable format 512 created during the steps set forth in FIG. 5. The software interface 602 allows the user to see the list of databases 604 in a human readable format that can be dynamically enabled or disabled using the software interface. In this implementation, the user can simply check or uncheck a box corresponding to the database the user would like to enable or disable. The software will then update the status of the database in the device and databases containing duplicative or undesirable hash/command sets can be dynamically disabled without deleting the entire database from the device.

Figure 7:
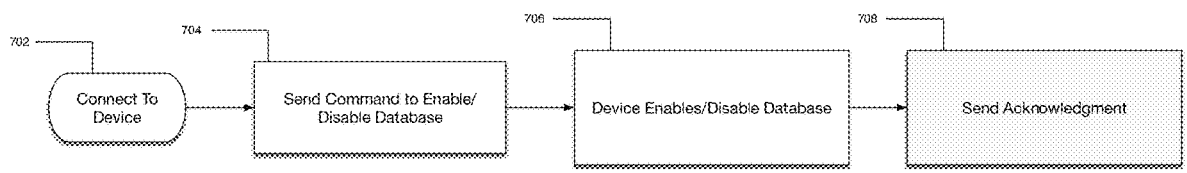
FIG. 7 depicts a diagram with the steps required to implement the user implemented changes from the software interface to the device.

FIG. 7 depicts a diagram implementing the enable/disable functionality described in the preceding figure. After the user has selected which databases should be enabled or disabled using the software interface, the software connects to the device 702. The software then sends the corresponding command sets to the device to enable or disable the databases 704 as selected by the user in the software interface. The device then enables or disables the databases 706. Finally, the user may receive an acknowledgment from the software 708 indicating that the databases were enabled or disabled as requested. With the conflicting databases disabled and the desired databases enabled, both internal conflicts and the undesirable multiple device scenario of FIG. 3 are addressed so that only the device intended to be operated by the user sends commands based on electromagnetic signals sent by the user.

In certain instances, it may be advantageous to dynamically enable or disable sets of databases based on certain known conditions. For example, a device may contain many databases preconfigured for use with many known use cases such as certain computers, media center devices, or branded media streaming devices. The preconfigured databases are loaded onto the device prior to a user purchasing the device. This allows the user to simply purchase the device, connect it to the media streaming device of their choice, and be able to use their remote control with the device without any further configuration. However, having many different databases preconfigured on the device may result unintended commands being sent to electromagnetic signals sent by the user. As a result, a more streamlined method for dynamically enabling or disabling databases preconfigured on a device is needed.

Figure 8:
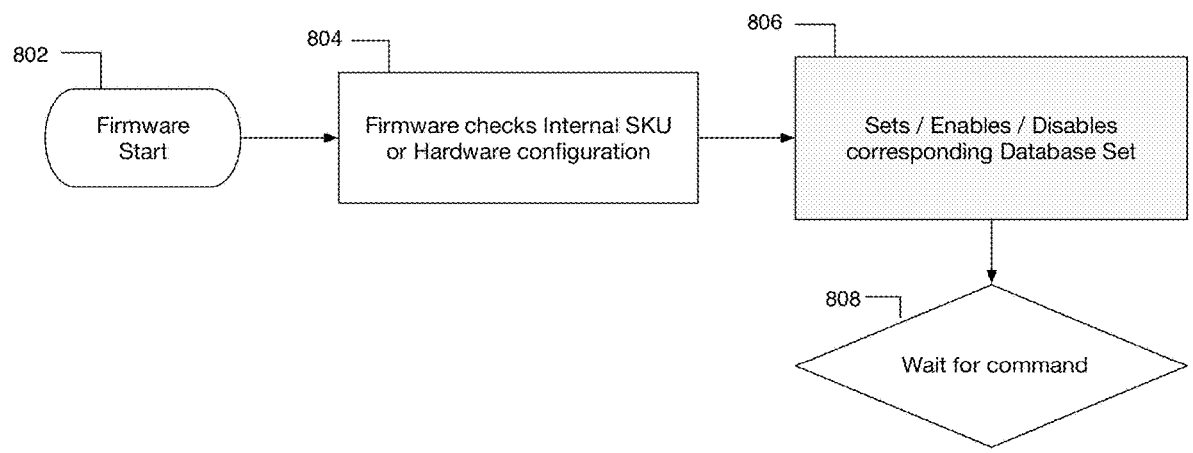
FIG. 8 depicts a diagram with the steps required for the firmware implemented dynamic enabling and disabling of databases.

FIG. 8 depicts the steps for a firmware implementation solution to dynamically enable or disable the preconfigured databases on a device. In one implementation of the invention, the firmware starts 802 when the device (e.g. Flirc USB) is connected to the media streaming device, computer, or other media center device. The firmware then checks an internal SKU or hardware configuration 804, or the type of hardware the device has been connected to. Based on the detected SKU, hardware configuration or type of hardware, the firmware then sets, enables, and disables the appropriate corresponding database set(s) 806.

For example, if the device is connected to a particular brand of media streaming device such as a Kodi enabled media center, it can set and enable the database(s) corresponding only to that particular media streaming device and disable all other databases corresponding to other media streaming devices. As a result, commands sent to a different device connected to a different media streaming device in the same room as the device connected to the Kodi enabled media center will not simultaneously and unintentionally result in a command being sent to either the Kodi enabled media center or the other media streaming device(s). The firmware is then ready to wait for a command 808. The firmware can be configured to begin the dynamic enable/disable cycle described above each time it is connected to a new media streaming device or other media center device. The firmware can also be configured to respond to a specific SKU or other signal to dynamically set, enable, and disable database sets based on known and desired configurations for particular users or use cases. The foregoing example using a Kodi enabled media center operates in the same manner for any other type of hardware which interacts with the device.

In another implementation, the Kodi enabled media center (or other hardware interacting with the device) can send a command to the device. The command sent to the device initiates the enabling and disabling of databases on the device in the manner set forth in the preceding paragraph. As with the automatic detection implementation, the Kodi enabled media center is only one example of a hardware/software configuration that can send a command to begin the enable/disable cycle. Any hardware and/or software capable of sending a command to the device containing the database(s) can be used in this alternative implementation of the invention.

Figure 9:
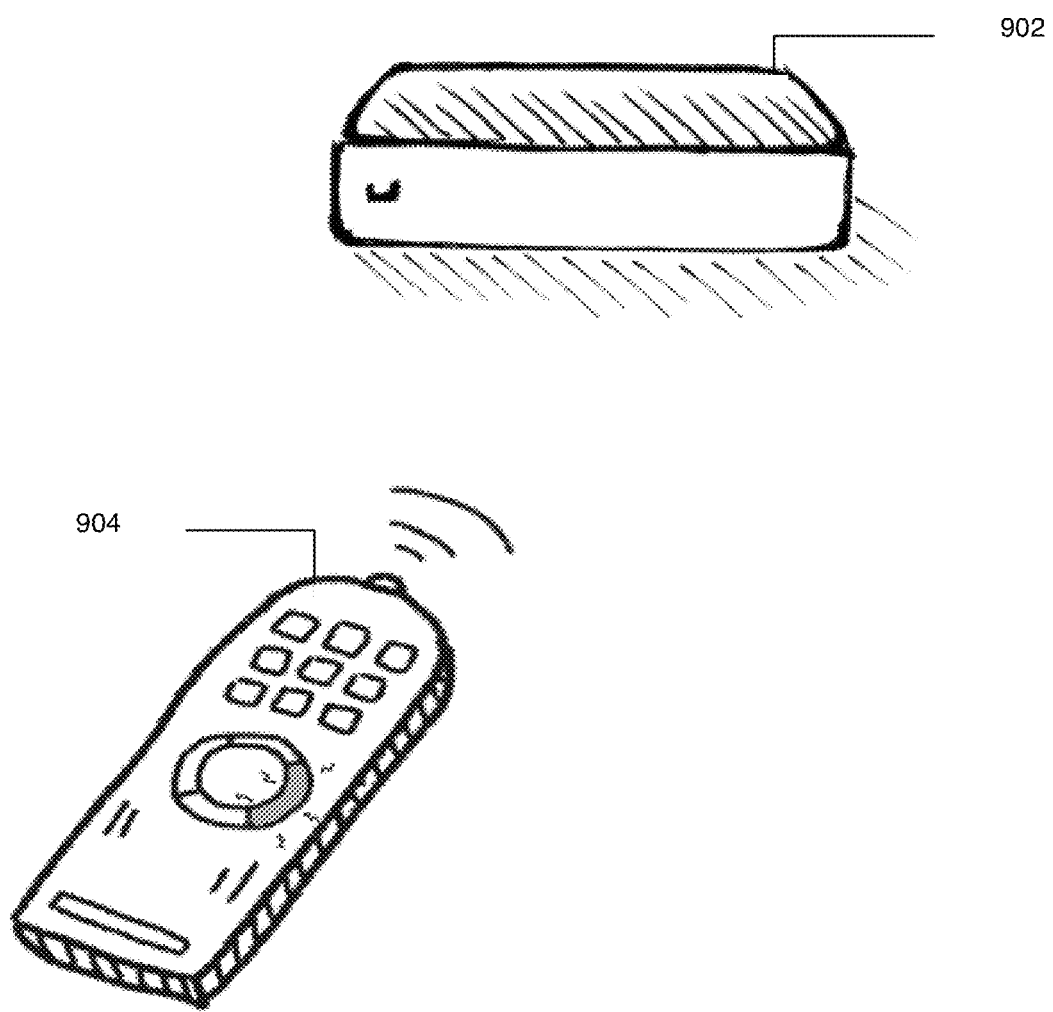
FIG. 9 depicts a remote control and a device containing a database or databases where at least one button on the remote control is specially configured to enable or disable a database or set of databases on the device.

FIG. 9 depicts a hardware implementation of the present invention allowing a user to enable or disable databases. At least one button on a remote control 904 is configured to enable or disable a database or all databases on a device 902. The button on the remote control 904 can be configured to initiate the steps set forth in FIG. 8 directly in firmware. Alternatively, the button can be configured to launch the software described above and either allow the user to enable or disable databases or automatically have the software send the appropriate commands to enable or disable databases. The user can also receive feedback using light emitting diodes (LEDs) on the remote control 904, a screen on the remote control 904, or other visual feedback provided by the remote control 904, the device 902, or the media center or other component connected to the device.

Figure 10:
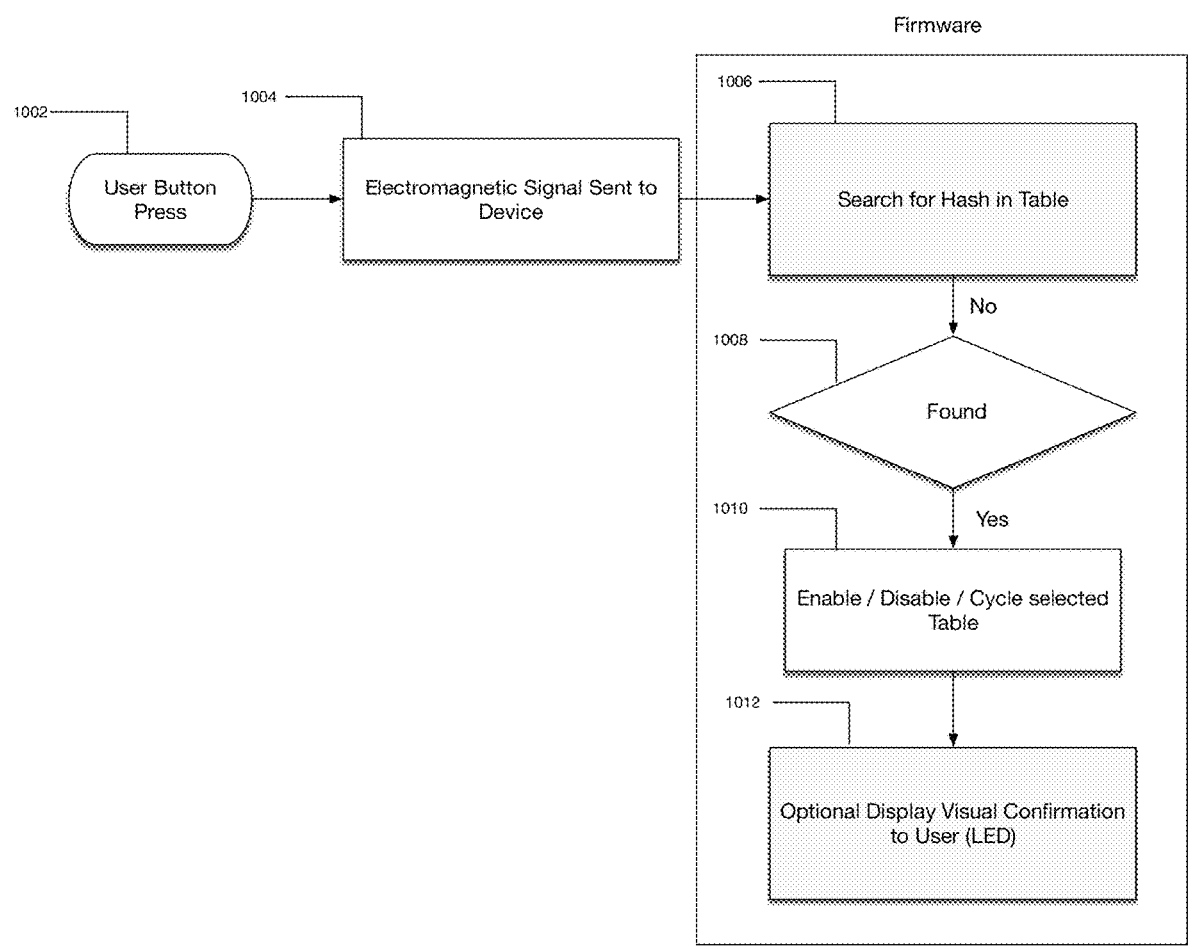
FIG. 10 depicts a diagram with the steps used to implement the hardware based enabling or disabling of databases depicted in FIG. 9.

FIG. 10 shows the steps to implement the hardware based enabling or disabling of databases depicted in FIG. 9. First, the user presses a button 1002 that sends an electromagnetic signal to the device 1004. The button can be a physical button, a response to a capacitive or resistive button or screen, a voice command, or any other method known in the art to initiate the sending of an electromagnetic signal from a device. Once the electromagnetic signal is received by the device, the firmware initiates and searches for the specific hash in database 1006. The firmware then finds the hash 1008. The desired database(s) is then enabled or disabled 1010. Finally, there may be an optional display of visual confirmation to the user 1012 using one of the methods described above.

To conclude, various implementations of methods and devices for learning and playing back infrared and other external signals have been described. These methods and devices allow for any standard infrared remote control to be used to send standard computer commands to a computer. In other embodiments the methods and devices may be adapted for signals other than infrared and for devices other than a computer.

Specific embodiments of the invention have been shown in the drawings and described in detail herein to help elucidate the inventive concepts. It should be understood, however, that the invention is not to be limited to the particular forms disclosed; rather, the invention is to cover all modifications, equivalents, and alternatives falling within the scope of the claims.

What is claimed is:

1. A method for enabling a command set that is specifically associated for communication between a remote control and a device, the method comprising:
storing a plurality of command sets within the device, each of the command sets within the plurality of command sets comprising multiple commands;
receiving a first signal at the device from the remote control, the first signal identifying a first command set, within the plurality of command sets, that is uniquely associated with the device for a period of time;
enabling the first command set on the device in response to the first signal;

disabling a second command set on the device in response to the first signal, the second command set being within the plurality of command sets and different from the first command set;

receiving a second signal at the device from the remote control, the second signal corresponding to at least one command within the multiple commands in the first command set; and performing an operation associated with the at least one command received at the device, the operation being performed by the device in response to receiving the second signal.

2. The method of claim 1 wherein the remote control communicates with the device using an electromagnetic signal.

3. The method of claim 2 wherein the electromagnetic signal is an infrared signal.

4. The method of claim 1 wherein the first command set is enabled by a first hash value transmitted from the remote control, the first hash value being uniquely associated with the first command set.

5. The method of claim 1 further comprising the step of generating a list of the plurality of command sets in a human readable form in response to receiving the first signal.

6. The method of claim 5 wherein a user selects the first command set from the list of the plurality of command sets resulting in the first command set being enabled.

7. The method of claim 6 wherein the second command set is disabled in response to the user selecting the first command set.

8. The method of claim 1 wherein the first command set is preconfigured on the device and associated with a device type corresponding to the device.

9. The method of claim 1 wherein the plurality of command sets is stored on the device prior to the device being purchased by a user.

10. The method of claim 1 wherein the device is a USB device.

11. The method of claim 10 wherein each step is automatically performed in response to the USB device being plugged into a second device.

12. The method of claim 11 wherein the second device is a Kodi enabled media center device.

13. The method of claim 1 wherein the step of enabling the first set of commands is hardware based implemented.

14. The method of claim 1 wherein the step of receiving the first signal is performed in response to a user pressing a button on the remote control.

* * * * *